United States Patent [19]

Higbee et al.

[11] 3,928,661
[45] Dec. 23, 1975

[54] SELECTIVE COATING OF A SUBSTRATE WITH POLY(ARYLENE SULFIDE)

[75] Inventors: David E. Higbee; William D. Powell, Jr., both of Bartlesville, Okla.

[73] Assignee: Phillips Petroleum Company, Bartlesville, Okla.

[22] Filed: June 1, 1973

[21] Appl. No.: 366,245

[52] U.S. Cl. ............... 427/259; 264/331; 427/264; 428/195; 428/207; 428/209; 428/210
[51] Int. Cl.² .......................................... B05D 1/32
[58] Field of Search ........ 117/5.5, 8.5, 38; 264/331; 427/259, 264

[56] References Cited
UNITED STATES PATENTS

| | | | |
|---|---|---|---|
| 2,991,188 | 7/1961 | Wing et al. | 117/5.5 |
| 3,121,019 | 2/1964 | Blay | 117/5.5 |
| 3,139,352 | 6/1964 | Coyner | 117/5.5 |
| 3,149,987 | 9/1964 | Crandall | 117/5.5 |
| 3,241,518 | 3/1966 | Johnson | 117/5.5 X |
| 3,354,129 | 11/1967 | Edmonds, Jr. et al. | 260/79 |
| 3,398,010 | 8/1968 | Harvey | 117/5.5 |
| 3,492,125 | 1/1970 | Ray | 117/123 D X |
| 3,502,496 | 3/1970 | Jarvis et al. | 117/5.5 X |
| 3,622,376 | 11/1971 | Tieszen | 117/132 B |
| 3,634,125 | 1/1972 | Tieszen | 117/49 |

Primary Examiner—William D. Martin
Assistant Examiner—Dennis C. Konopacki

[57] ABSTRACT

A substrate surface which is to be partially coated with poly(arylene sulfide) is masked, in those areas not to be coated, with a masking composition containing diatomaceous earth, alkaline earth carbonate, or alkaline earth silicate. The substrate surface is then coated with poly(arylene sulfide) and, after the coating has cured, the coating is peeled away from the masked portion of the substrate. The masking composition is then washed from the finished product.

19 Claims, No Drawings

SELECTIVE COATING OF A SUBSTRATE WITH POLY(ARYLENE SULFIDE)

BACKGROUND OF THE INVENTION

This invention relates to a method of applying a poly(arylene sulfide) coating to selected parts of a substrate surface. In another aspect it relates to the use of diatomaceous earth, alkaline earth carbonate, or alkaline earth silicate to mask substrate surface areas not desired to be coated by poly(arylene sulfide). In still another aspect it relates to the selective coating of portions of a substrate surface with poly(phenylene sulfide). In yet another aspect it relates to production of a poly(arylene sulfide) film by peeling a poly(arylene sulfide) coating from the masked portion of a substrate.

The utility of poly(arylene sulfide) as a coating for metal, ceramics, and other surfaces is well known. In many applications, however, the requirement for leaving some surfaces of the coated object uncoated or the desirability of coating only a portion of the surface of an object has led to the need for a method of selectively coating such surfaces. Due to the high temperatures required in the application and curing of poly(arylene sulfide) coatings, the use of ordinary masking tapes or other similar products is not feasible. Accordingly, a method has been developed for selectively coating a substrate by use of a masking composition which is noninjurious to the surface of the substrate, is not wetted by heated and softened poly(arylene sulfide), remains stable under the high temperatures required for application and curing of the coating, and can be easily washed from the uncoated surface after use.

SUMMARY OF THE INVENTION

It is an object of this invention to provide a method for the selective coating of portions of a substrate surface with poly(arylene sulfide). Another object is to provide products which are selectively coated with a poly(arylene sulfide) resin. Still another object is to provide for selective coating of substrates with poly(phenylene sulfide). Yet another object is to provide for the production of a poly(arylene sulfide) film.

Any normally solid poly(arylene sulfide) can be used in the practice of this invention. The term poly(arylene sulfide) is meant to include not only homopolymers but also arylene sulfide copolymers, terpolymers, and the like. Poly(arylene sulfides) which are particularly suited for use in this invention are those having inherent viscosities in chloronaphthalene (0.2 g polymer in 100 cc chloronaphthalene) at 206° C. of at least 0.08, preferably between 0.1 and 0.3, more preferably between 0.13 and 0.23. Examples of suitable polymers are disclosed, for instance, in Edmonds et al U.S. Pat. No. 3,354,129, Nov. 21, 1967. The presently preferred polymer is poly(phenylene sulfide). Other examples of poly(arylene sulfides) are poly(4,4'-biphenylene sulfide), poly(2,4-tolylene sulfide), and a copolymer from p-dichlorobenzene, 2,4-dichlorotoluene and sodium sulfide.

In addition, the poly(arylene sulfide) can be blended with other polymers, conventional additives, fillers, extenders, pigments, stabilizers, and the like. Especially preferred fillers are $TiO_2$, $Fe_3O_4$, and polytetrafluoroethylene. Up to 60 parts by weight, either singly or in combination of such fillers may be used, per 100 parts by weight of poly(arylene sulfide), 10–50 parts by weight being presently preferred.

In accordance with the invention, any metal, glass, or ceramic substrate which can be wetted by poly(arylene sulfide) and can withstand the high temperature required to cure the poly(arylene sulfide) coating can be selectively coated. Iron, steel, aluminum, titanium, copper, glass, ceramics, porcelain, and alloys such as nickel steel, bronze, etc., are examples of substrates which can be selectively coated in the manner herein described.

The substrate to be coated is prepared by degreasing, cleaning, and drying the surface to be coated. Cleaning can be accomplished by washing or wiping with trichloroethylene, acetone, or other similar cleaner or solvent, then air drying, wiping the surface dry, or drying by any other suitable method. That portion to which adherence of the poly(arylene sulfide) coating is not desired is then masked with a masking composition which will adhere readily to the clean substrate, which is capable of withstanding the high temperature of the coating and curing process, which will not be wetted by the poly(arylene sulfide) during the coating and curing process, and which can be readily removed by washing following the coating process. Diatomaceous earth, alkaline earth carbonates, alkaline earth silicates, and other similar materials, and admixtures thereof, are suitable masking compositions.

Specific materials which can be used as the masking composition are strontium carbonate, calcium orthosilicate, calcium metasilicate, calcium carbonate, barium carbonate, barium metasilicate, strontium silicate, or mixtures of these. A particle size of 200 mesh or smaller is preferred for these materials. Alkali metal silicates or carbonates are not suitable for surfaces subject to alkaline attack.

The masking composition can be applied to the substrate from a slurry which can be brushed or sprayed or into which the substrate can be dipped, or otherwise distributed on the portion of the surface of the substrate which is not to be coated with the poly(arylene sulfide). Good results have been obtained by using a slurry containing from about 20 percent to about 50 percent by weight of solids, the remainder being a fluid such as water; light hydrocarbons having 5–8 carbon atoms such as hexane, isooctane, and pentane; benzene; toluene; petroleum ether; alcohols or glycols having 1–4 carbon atoms such as methanol, ethanol, propanol, i-propanol, ethylene glycol, and propylene glycol; or mixtures thereof. Water or water/ethylene glycol mixtures are preferred. A wetting agent, usually a nonionic material such as alkylphenoxypolyethoxy alcohol, in the proportion of about 0.5 percent to about 1 percent by weight based on water can be used. Other suitable wetting agents are octylphenoxypolyethoxy ethanol (Triton X-100, Rohm & Haas), aliphatic polyethers (Antarox BL240, GAF Corp.), nonylphenylpolyethylene glycol ether (Tergitol NP-35, Union Carbide), and trimethylnonylpolyethylene glycol ether (Tergitol TMN, Union Carbide).

In general, it is desirable that the masked surface be uniformly covered with a coat of the masking composition to a thickness in the range of about 0.2 to about 5 mils, preferably about 0.5 to about 2.0 mils. Very thick coats utilize unnecessary amounts of the masking composition and increase washing time following the coating operation. After application of the masking composition, the liquid carrier is evaporated to present a dry, masked surface. If desired, carrier evaporation can be accelerated by a warm air stream, by heating the substrate so that the liquid carrier is flashed off on contact, or by other suitable means.

A poly(arylene sulfide) coating may be applied to the portion of the substrate surface to be coated as well as to at least a portion of the masked substrate surface by any means known to the art. Examples of suitable treating processes are disclosed, for instance, in Ray U.S. Pat. No. 3,492,125, Jan. 27, 1970; Tieszen et al. U.S. Pat. No. 3,622,376, Nov. 23, 1971; and Tieszen U.S. Pat. No. 3,634,125, Jan. 11, 1972. A preferred method is to spray a slurry containing the coating material onto the substrate surface.

The poly(arylene sulfide) coating is then cured by any suitable manner known in the art. For example, a high temperature curing step can comprise heating the coated substrate for a time in the range of about 1 minute to about 5 hours at a temperature in the range of about 500° F. to about 900° F. Preferred conditions for the curing of a poly(phenylene sulfide) coating comprise a temperature in the range of about 600° to about 750° F. for a period of time in the range of about 15 minutes to about 2 hours. During the process of applying the poly(arylene sulfide) coating to the substrate and during the curing operation, the masking composition continues to adhere to the substrate without being wetted by the poly(arylene sulfide) coating and without reacting with the substrate or the poly(arylene sulfide) coating.

After the poly(arylene sulfide) coating has been cured, the poly(arylene sulfide) coating can be easily stripped from that portion of the substrate which was treated with the masking composition without disturbing the poly(arylene sulfide) coating which has adhered to the unmasked portion of the substrate. After the poly(arylene sulfide) coating has been stripped from the masked portion of the substrate, the masking composition can be washed from the substrate with water, soap and water, or with any of the previously discussed liquids useful as carriers for depositing the masking composition on the substrate, or combination thereof, or can be removed by any other method desired. The result of this process is a partially coated substrate, the uncoated portions of which are clean and unaffected by the masking, coating, and mask removal operations.

The poly(arylene sulfide) coating stripped from the masked portion of its substrate in accordance with the invention is smooth on one side and has a roughened surface on the side which was in contact with the masking compound. This film can be used in any application for a poly(arylene sulfide) film where smoothness is not required or is required on one side only or where a roughened surface is desired.

The following examples are presented to further illustrate the invention:

EXAMPLE I

A slurry was prepared by mixing 1 part by weight diatomaceous earth and 3 parts by weight of water in a blender. A steel coupon 3 inches × 6 inches in size was degreased, cleaned, and dried. About one-half of the surface was sprayed with the slurry to deposit a masking composition layer about 1 mil thick. The water was then evaporated from the deposited layer.

A slurry of poly(phenylene sulfide) resin, containing about 30 parts by weight of poly(phenylene sulfide), 6 parts by weight of polyfluoroethylene, 7½ parts by weight of $TiO_2$, and 60 parts by weight of water containing 1 percent by weight octylphenoxypolyethoxy-ethanol (Triton X-100, Rohm & Haas) was sprayed on the unmasked surface, overlapping about one-half inch onto the masked surface, to a thickness of about 1½ mils. The coupon was cured at 700° F. for 45 minutes. After curing, the poly(phenylene sulfide) coating overlapping the masked portion of the coupon stripped readily from the coupon, but the poly(phenylene sulfide) coating adhered firmly to the untreated surface. The masking compound was then washed from the metal surface using tap water. The uncoated surface was unmarked and had not been attacked by the masking substance.

EXAMPLE II

The same procedure was performed, substituting as a masking composition a slurry of 1 part by weight precipitated chalk in 3 parts by weight water containing about 0.5 percent by weight of octylphenoxypolyethoxy ethanol. The results were the same as in Example I. The poly(phenylene sulfide) coating, after curing at 700° F. for 45 minutes, adhered firmly to the surfaces not coated with the masking composition but stripped readily from the masked portion. The masking composition was removed using warm water and soap. The uncoated surface was unmarked and had not been attacked by the masking substance.

EXAMPLE III

A copper slab approximately 12 inches × 12 inches in size was coated completely on one surface with the masking composition used in Example I. A layer of poly(phenylene sulfide) coating about 5 mils thick was applied to the masked surface and cured. After curing and cooling, the 5 mil thick coating of poly(phenylene sulfide) was stripped off in a single 12 inches × 12 inches sheet. The outer surface of the sheet was smooth while the surface of the sheet facing the masking material had a roughened surface. The copper plate surface was readily cleaned with soap and water, and showed no signs of damage.

Reasonable variations and modifications are possible within the scope of the foregoing disclosure and the appended claims to the invention.

We claim:

1. A process for selectively coating a first portion of a surface of a substrate with a poly(arylene sulfide) composition, said process comprising:
    coating a second portion of said surface of said substrate with a masking composition comprising at least one member of the group consisting of diatomaceous earth, alkaline earth carbonates, and alkaline earth silicates,
    applying a coating of said poly(arylene sulfide) composition to said first portion and at least part of the thus masked second portion of said substrate,
    heating the thus-coated substrate to a temperature sufficient to cure said poly(arylene sulfide) composition,
    stripping said poly(arylene sulfide) composition from the masked second portion of said surface of said substrate, and
    treating said substrate to remove said masking composition.

2. The process of claim 1 wherein said poly(arylene sulfide) is poly(phenylene sulfide).

3. The process of claim 2 wherein said poly(phenylene sulfide) composition contains from about 10 to about 50 parts by weight of polytetrafluoroethylene per 100 parts poly(phenylene sulfide).

4. The process of claim 3 wherein said masking composition comprises diatomaceous earth.

5. The process of claim 3 wherein said masking composition comprises precipitated chalk.

6. The process of claim 1 wherein heating the coated substrate to cure said poly(arylene sulfide) composition comprises heating to a temperature within the range of from about 500°F. to about 900°F.

7. The process of claim 6 wherein said coated substrate is cured for a time within the range of from about 1 minute to about 5 hours.

8. The process of claim 7 wherein the coated substrate is heated to a temperature within the range of from about 600°F. to about 750°F. for a period of time within the range of about 15 minutes to about 2 hours.

9. The process of claim 8 wherein said poly(arylene sulfide) is poly(phenylene sulfide).

10. The process of claim 9 wherein said poly(phenylene sulfide) composition contains from about 10 to about 50 parts by weight of polytetrafluoroethylene per 100 parts poly(phenylene sulfide).

11. The process of claim 10 wherein said masking composition comprises diatomaceous earth.

12. The process of claim 10 wherein said masking composition comprises precipitated chalk.

13. A process for making a poly(arylene sulfide) film, said process comprising:
coating a first portion of a substrate surface with a masking composition comprising at least one member of the group consisting of diatomaceous earth, alkaline earth carbonates, and alkaline earth silicates,
applying a coating of poly(arylene sulfide) to at least a part of the thus masked first portion of the substrate surface,
heating the thus-coated substrate to cure said poly(arylene sulfide) coating, and
stripping said poly(arylene sulfide) coating from the masked first portion of said surface of said substrate.

14. The process of claim 13 wherein said poly(arylene sulfide) is poly(phenylene sulfide).

15. The process of claim 13 wherein the step of heating the coated substrate to cure said poly(arylene sulfide) composition comprises heating to a temperature within the range of from about 500°F. to about 900°F.

16. The process of claim 15 wherein heating the coated substrate comprises heating to a temperature within the range of from about 600°F. to about 750°F. for a period of time within the range of from about 15 minutes to about 2 hours.

17. The process of claim 16 wherein said poly(arylene sulfide) is poly(phenylene sulfide) and wherein said poly(phenylene sulfide) composition contains from about 10 to about 50 parts by weight of polytetrafluoroethylene per 100 parts poly(phenylene sulfide).

18. The process of claim 17 wherein said masking composition comprises diatomaceous earth.

19. The process of claim 17 wherein said masking composition comprises precipitated chalk.

* * * * *